United States Patent [19]

Hartenstein et al.

[11] Patent Number: 6,099,404
[45] Date of Patent: Aug. 8, 2000

[54] PROCESS AND APPARATUS FOR THE HUMIDIFICATION OF AIR IN AN AIRCRAFT CABIN

[75] Inventors: Laurent Hartenstein, La Salvetat Saint Gilles; Michel Eglem, Toulouse, both of France

[73] Assignee: Liebherr-Aerospace Toulouse S.A., Toulouse Cedex, France

[21] Appl. No.: 09/123,476

[22] Filed: Jul. 28, 1998

[30] Foreign Application Priority Data

Jul. 28, 1997 [FR] France .................................. 97 09685

[51] Int. Cl.$^7$ .............................. B60H 3/02; G05D 21/00
[52] U.S. Cl. ........................ 454/157; 126/113; 236/44 A
[58] Field of Search .................. 454/71, 76, 72, 454/73, 157; 236/44 A, 44 R; 126/113; 261/130

[56] References Cited

U.S. PATENT DOCUMENTS

| | | |
|---|---|---|
| 2,979,916 | 4/1961 | Mason . |
| 3,314,412 | 4/1967 | Krause ..................................... 126/113 |
| 3,761,019 | 9/1973 | Delic ....................................... 237/12.3 |
| 4,272,014 | 6/1981 | Halfpenny et al. ................... 236/44 B |

FOREIGN PATENT DOCUMENTS

| | | |
|---|---|---|
| 0 453 385 | 10/1991 | European Pat. Off. . |
| 53104125 | 3/1980 | Japan . |

*Primary Examiner*—William Wayner
*Attorney, Agent, or Firm*—Young & Thompson

[57] ABSTRACT

A process and apparatus for humidification of air in a cabin (4) of an aircraft, wherein a secondary flow of warm air is taken from a primary warm air flow that originates in a turbomachine of the aircraft. This secondary warm air flow is introduced into a boiler (6) enclosing an air/water heat exchanger (17) and at least partially filled with water, so as to form in said boiler a flow of water vapor as a function of the secondary warm air flow. At the outlet of the boiler (6) the flow of water vapor and the flow of secondary warm air are in mixed together and injected into the heating/air conditioning circuit for the air in the cabin (4).

15 Claims, 3 Drawing Sheets

PROCESS AND APPARATUS FOR THE HUMIDIFICATION OF AIR IN AN AIRCRAFT CABIN

CROSS REFERENCE TO RELATED APPLICATION

This application corresponds to French application 97 09685 of Jul. 28, 1997, the disclosure of which is incorporated herein by reference.

FIELD OF THE INVENTION

The invention relates to a process for humidification of the air in an aircraft cabin, according to which water vapor is injected into a heating/air conditioning circuit of the cabin connected to a primary warm air circuit from a turbomachine of said aircraft. It also relates to a system for humidification used in this process.

BACKGROUND OF THE INVENTION

The control of relative humidity level in the interior of aircraft during long flights at high altitude is nowadays almost obligatory so as to improve the comfort of the passengers and the crew. Thus, if the relative humidity is too low, for example below 10%, the passengers and the crew, during long flights, can be subject to unpleasant sensations, particularly drying of the eyes, the nose and the throat. Moreover, for the crew, such humidity can give rise to health problems, such as kidney stones, exfoliation of the skin in the presence of specific irritants.

So as to overcome these drawbacks, it is usual nowadays to provide aircraft with humidifiers designed to permit maintaining a relative humidity of the order of 15% to 30% within the cabin and thus to improve the comfort of the passengers and the crew.

Known humidification devices such as particularly are described in U.S. Pat. No. 4,272,014, inject droplets of water into a current of warm air from a turbomachine of the aircraft. The principal drawback of such devices resides in the fact that they do not permit guaranteeing total evaporation of the water. Because of this, there can be phenomena of condensation of water on cold surfaces of the aircraft, which gives rise to the risk of corrosion of the structure of said aircraft.

Moreover, the solution which would permit overcoming this drawback, consisting in using an injection device provided with a small cross section atomizing nozzle so as to ensure complete atomization of the water, leads to rapid obstruction of the atomizing nozzle, resulting in the form of mineral deposits. Because of this, the injection device must be cleaned frequently, which gives rise to high maintenance costs.

Moreover, with such injection devices, the mineral particles can be entrained in the heating/air conditioning circuit and give rise to problems of corrosion. For this reason, the injection devices are provided with a filter which however has the drawback of requiring frequent cleaning and hence increasing maintenance costs.

Finally, such injection devices have the drawback of being adapted to be the source of contamination by diffusion through the cabin of bacterial contaminants or viruses, contained in the water.

OBJECTS OF THE INVENTION

The present invention overcomes all these drawbacks and has for its essential object to provide a humidification device requiring only very little maintenance, and offering maximum safety in terms of corrosion and contamination.

Another object of the invention is to provide a humidification device permitting controlling the consumption of water required for a flight.

Another object of the invention is to provide a Humidification device whose operation requires only very low electrical power.

SUMMARY OF THE INVENTION

To this end, the invention comprises a humidification process for air in an aircraft cabin, according to which:

- a secondary air flow is taken from the primary warm air circuit,
- this secondary warm air flow is introduced into a boiler enclosing an air/water heat exchanger and filled at least partially with water, so as to form in said boiler a flow of water vapor as a function of said secondary flow of warm air,
- at the outlet of the boiler, the flow of water vapor and the flow of secondary warm air are mixed, so as to obtain a secondary warm air flow loaded with water vapor,
- and this secondary warm air flow loaded with water vapor is injected into the heating/air conditioning circuit for the air in the cabin.

The process according to the invention therefore consists in bringing to boiling a volume of water within a closed reservoir under pressure, by heat transfer between the warm secondary air from the primary warm air circuit and this volume of water, and in producing superheated water vapor which is entrained by the warm air flow.

Because of this, and in a first instance, only the water vapor is entrained by the warm air flow and as a result the distribution circuit is isolated from the water supply circuit. There exists no risk that mineral particles or solid bodies will be entrained by this warm air flow and pollute the distribution circuit.

Moreover, by means of a suitable dimensioning of the boiler, this process can provide a long dwell time of the water at its boiling temperature in said boiler, thereby ensuring sterilization of this water before distribution of the vapor into the cabin, and maximum safety in terms of microbial contamination.

Moreover, the mixture of the vapor and the warm air having served for its generation is carried out in the boiler itself, so as to ensure the transport of humidified air at a very low level of relative humidity, thereby overcoming the risks of condensation of the vapor in the heating/air conditioning circuit of the aircraft.

Moreover, the fact of using a compact air/water exchanger for the generation of vapor gives rise to a system whose mineral deposit load is very low, adapted to operate simply by periodic cleaning of the boiler in which the minerals are deposited.

Finally, such a design provides a system requiring only very low electrical operating power.

According to a preferred embodiment:

- the dew point temperature of the air in the cabin is computed from a signal representing the cabin pressure and signals representative of the temperature and humidity measured in the cabin,
- the quantity of humidity introduced into the heating/air conditioning circuit is limited such that the dew point in the cabin will be maintained at a predetermined reference value.

The fact of using, as a parameter of regulation, the dew point in the cabin, permits controlling on the one hand the consumption of water of the system, in a manner totally independent of the temperatures selected for the cabin, and on the other hand, the risk of condensation on cold walls of the aircraft, and this while remaining within comfort zones currently respected.

Moreover, it is to be noted that the control of the dew point is carried out from measurements of relative humidity, of temperature and of pressure in the cabin, and hence does not require the use of a dew point temperature detector.

According to a preferred embodiment, this control of the humidity level is carried out in a closed circuit, and there is maintained for this purpose a constant value of dew point in the cabin by adjusting the secondary flow rate of warm air introduced into the boiler.

According to another characteristic of the invention, the boiler is initially filled with a predetermined volume of water, and periodic refillings of the boiler are effected when the volume of water within this latter reaches a predetermined minimum level.

There is thus obtained a total independence of the control of water flow and of humidity control, ensuring fine control of the vapor flow and maximum safety of the system (no boiling over, no risk of insufficient production of vapor . . . ).

Moreover, during the phase of descent of the aircraft, there is preferably carried out an emptying of the boiler when said aircraft is below a predetermined altitude.

The invention also covers a humidification device comprising:

- a boiler constituted by a closed principal register enclosing an air/water heat exchanger and provided in its lower portion with a water inlet and a warm air inlet, and in its upper portion an outlet collector,
- a secondary supply conduit for warm air to the boiler connected to a primary circuit of warm air from a turbomachine of the aircraft, and provided with a regulating valve for the warm air flow delivered to said boiler,
- a supply conduit for water to the boiler provided with at least one supply valve,
- a conduit connecting the outlet collector of the boiler and the heating/air conditioning circuit of the aircraft,
- and a control unit programmed to control each supply valve so as to ensure the filling with water of the boiler, and to adjust the position of the regulation valve so as to regulate the warm air flow delivered into said boiler.

This device comprises moreover and preferably a temperature and relative humidity detector adapted to be disposed in the cabin and adapted to deliver signals representative of the temperature and the relative humidity in said cabin.

The control unit is thus moreover programmed to compute, from the signals delivered by the temperature and relative humidity detector, and from a signal representative of the pressure in the cabin, the dew point in said cabin, and to adjust the regulation valve of the secondary warm air flow rate, so as to obtain in the cabin a dew point of predetermined value.

According to another characteristic of the invention, this humidification device comprises a detector of the level in the boiler and adapted to deliver signals representative of the volume of water contained in said boiler, the control unit being programmed to control the opening of each supply valve upon reception of a signal representative of a predetermined minimum volume of water within the boiler, and to control the closure of each supply valve upon receipt of a signal representative of a predetermined maximum volume of water within said boiler.

Moreover, this humidification device preferably comprises two valves, called supply and isolation valves, disposed in the water supply conduit, the control unit being adapted to control in cascade the opening and the closing of said valves for refilling the boiler with water.

The level detector is itself preferably a capacitative detector consisting in a tubular probe adapted to extend into a lateral compartment of the boiler in communication with the principal register of said boiler.

The humidification device moreover preferably comprises:

- a purge valve for the boiler, the control unit being programmed to control the opening of said valve when the aircraft descends below a predetermined altitude,
- a temperature detector disposed in the outlet of the boiler and adapted to detect the superheating temperatures.

According to another characteristic of the invention, the air/water heat exchanger of the boiler is a plate heat exchanger delimiting the conduits for passage of warm air provided with internal fins connecting said plates.

BRIEF DESCRIPTION OF THE DRAWINGS

Other characteristics, objects and advantages of the invention will become apparent from the detailed description which follows, with reference to the accompanying drawings, which represent by way of non-limiting example a preferred embodiment. In these drawings, which form an integral portion of the present specification.

DETAILED DESCRIPTION OF THE INVENTION

Figure 1:
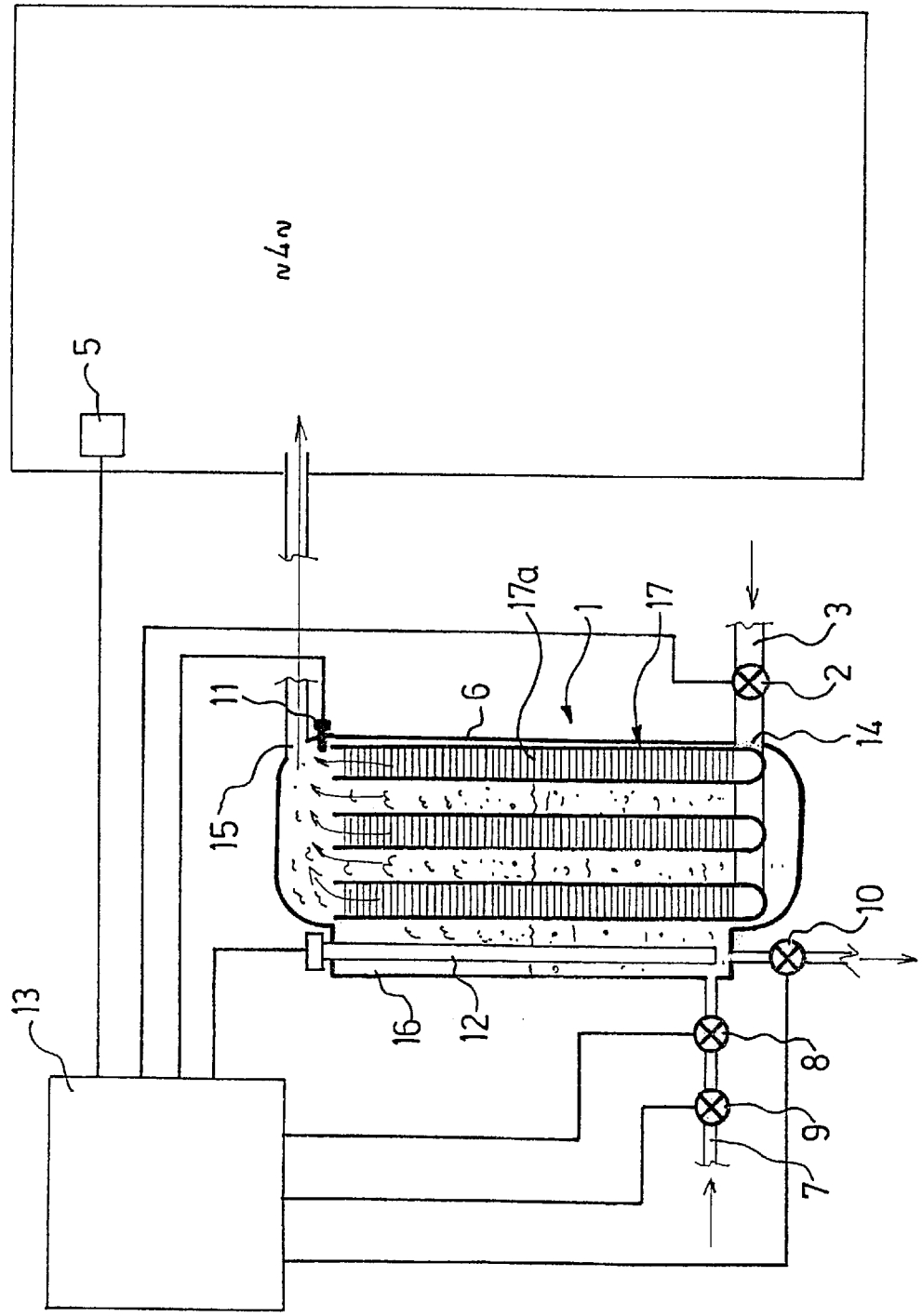
FIG. 1 is a diagrammatic view of a humidification system according to the invention.
Figure 2:
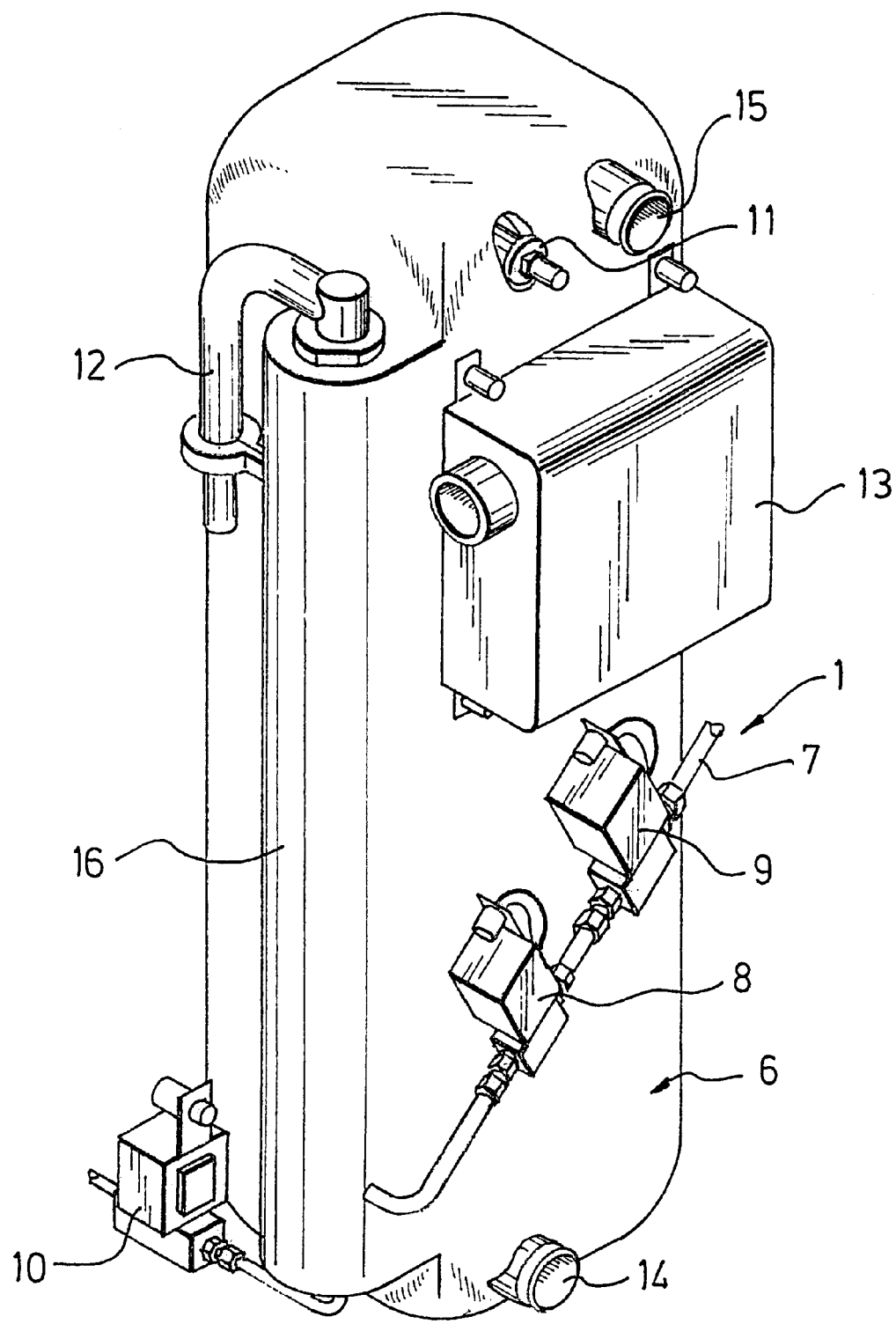
FIG. 2 is a perspective view of the boiler of this humidification system.
Figure 3:
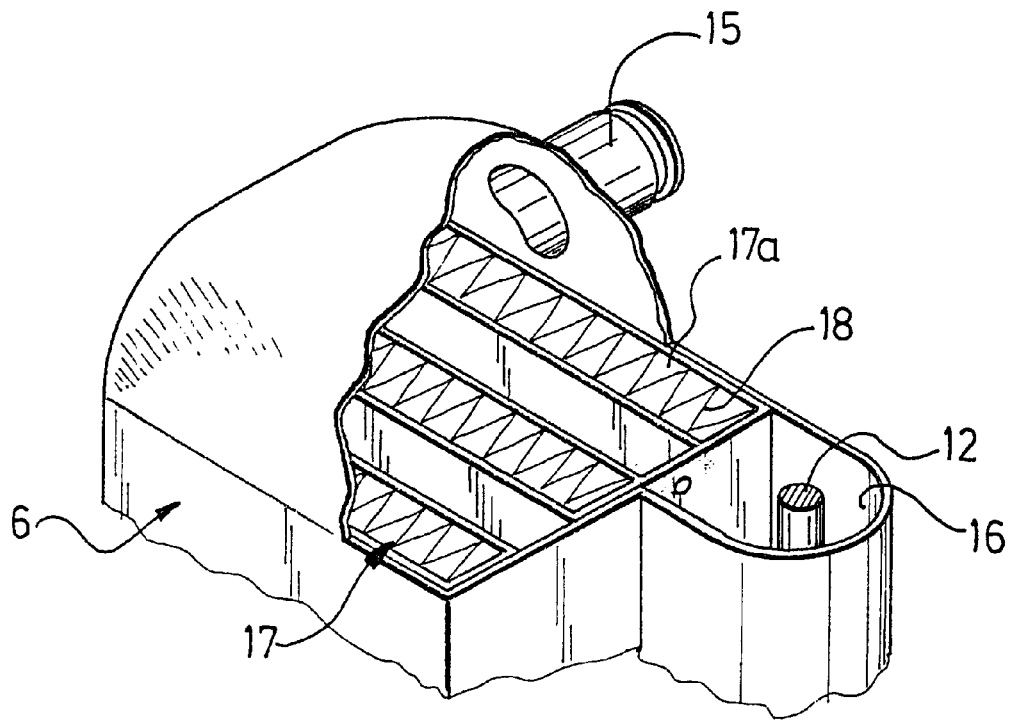
FIG. 3 is a fragmentary perspective view with parts broken away of the upper portion of this boiler.
Figure 4:
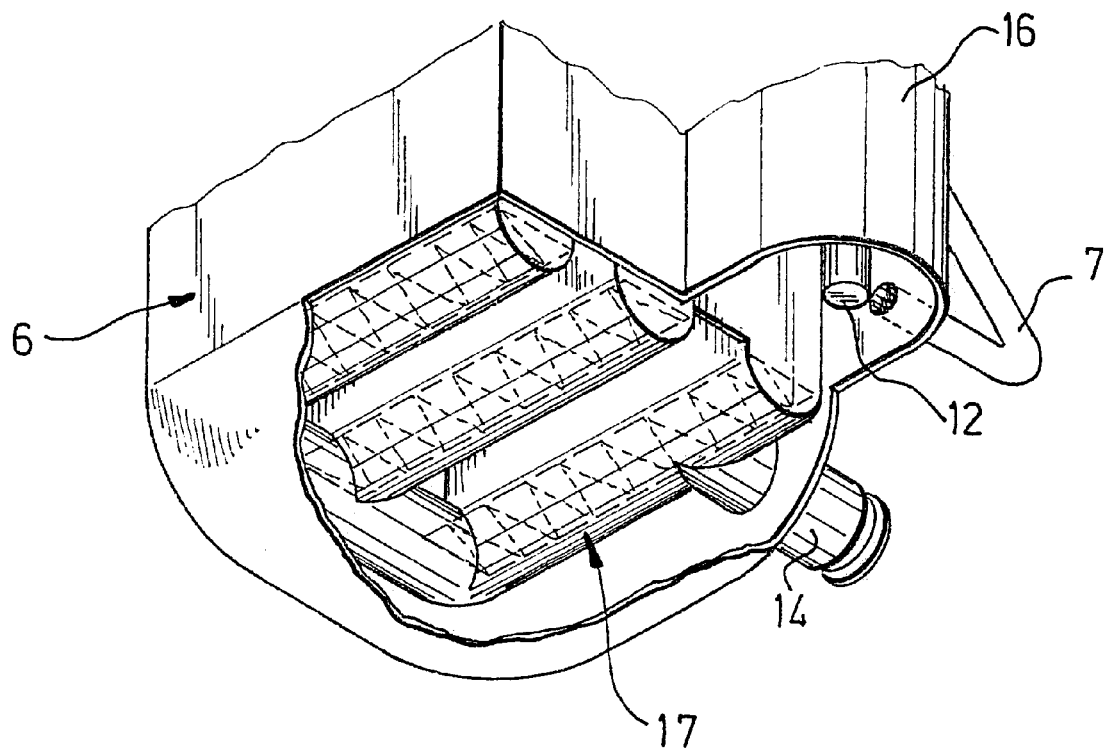
FIG. 4 is a fragmentary perspective view of the lower portion of this boiler.

The humidification system according to the invention is comprised of three subassemblies:

- a humidifier 1, which is the heart of the system, constituting a compact unit integrating the key elements of said system described hereafter, and ensuring particularly the management and supervision of this latter, and the production of vapor,
- a valve 2 for the regulation of warm air flow, disposed in a secondary conduit 3 for warm air connecting the humidifier 1 to the principal warm air circuit for air conditioning of the cabin 4, and adapted to adjust the flow rate of air delivered to the humidifier so as to adjust the humidity in said cabin.

This valve 2 is a butterfly valve controlled by an electric servomotor provided with two microswitches permitting detecting the totally open and totally closed states of said valve. In the course of normal operation, the position of the butterfly is adjusted by voltage impulses delivered to the servomotor by a control unit described hereafter. Moreover, during a non-functioning time, this valve 2 is maintained closed,

- and humidity and temperature detector disposed in the cabin 4, adapted to provide measurements of temperature and humidity permitting controlling the humidity in said cabin.

This detector 5 is comprised by a relative humidity detector and a temperature detector, and includes a fan ensuring effective circulation of air about the detection elements. The humidity detector is designed to deliver a variable frequency signal as a function of the relative humidity detected. The temperature detected is itself designed to deliver a continuous voltage signal proportional to the temperature measured in cabin 4.

The humidifier is itself comprised by the following elements:
- a boiler 6 adapted to produce evaporation of the water from the potable water circuit 7 of the aircraft,
- an isolation valve 8 disposed in the supply circuit of water 7 to the boiler 6,
- a supply valve 9 adapted to permit periodic refilling of the boiler 6,
- a purge valve 10 ensuring emptying of the boiler 6,
- a temperature detector 11 disposed so as to measure the temperature of the air at the outlet of the boiler 6, and adapted to detect superheating temperatures,
- a level detector 12 ensuring the detection of the level of water within the boiler 6,
- a control unit 13 ensuring control of the valves 2, 8, 9, 10 of the humidifier 1, the processing of the signals of the various detectors 5, 11, 12, the detection of misfunctions, and constituting an interface with external systems.

In the first instance, the boiler 6 ensures the transfer of heat between the warm air whose flow is regulated by the regulation valve 2, and the water enclosed in said boiler, and generates the vapor required to obtain suitable relative humidity in the cabin.

This boiler 6, which comprises a closed reservoir, comprises:
- a lower collector 14 at the warm air inlet,
- an upper collector 15 at the outlet for warm air loaded with vapor,
- a lateral compartment 16 in communication with the principal reservoir and adapted to receive the level detector 12,
- a heat exchanger 17 constituted by several vertical spaced parallel conduits such as 17a communicating at the level of their lower ends with the collector 14 for the inlet of warm air, and made of stainless steel 316 L because of the excellent anti-corrosion properties of this material. Moreover, each of these conduits has integral internal fins such as 18, in chevron arrangement.

In its operative mode, the boiler 6 is filled with water to a maximum level suitable to avoid any flow of water within the heat exchanger 17. The warm air circulating in the heat exchanger 17 ensures the boiling and evaporation of this water, and the generated vapor is then mixed with this warm air in the outlet collector 15.

The isolation valve 8 and supply valve 9 are themselves adapted to permit controlling the level of water within the boiler 6 by periodic supply of the boiler with potable water. The fact of providing two valves 8 and 9 has for its object to increase the certainty of functioning by providing two closures in the water supply circuit.

These two valves 8, 9 are identical. They are normally closed under the influence of a spring and are associated with an electromagnet permitting their opening under electrical control.

These valves 8, 9 are controlled in a manner so as to have:
- a closed condition when the humidifier 1 does not operate, when the boiler is determined to be "empty", and during emptying operations of the boiler 6,
- an open condition during operations of opening the water supply circuit 7 and the boiler 6.

Moreover, the supply valve 9 is controlled to have an open condition upon detection of a minimum filling level of the boiler 6, the isolation valve 8 being thus itself open then in cascade.

The purge valve 10 is of the same type as the abovementioned valves but is such as to permit a higher flow rate. It is controlled electrically so as to be open only during purge operations.

The temperature detector 11 is of the immersion type and is adapted to deliver an electrical signal as a function of the temperature of the air/vapor mixture.

The level detector 12 is a capacitative detector and consists in an annular probe adapted to extend to within the lateral compartment 16 of the boiler 6, associated with an electronic module adapted to convert the signal delivered by said probe into a variable frequency signal as a function of the detected water level. Four thresholds of level are used for control purposes: maximum level (overflow), high level, low level, "empty" level.

The control unit 13 comprises a central unit built about a microcontroller and comprising various interfaces adapted to permit it to:
- receive and process electrical signals from:
    - the humidity and temperature detector 5,
    - the water level detector 12 of the boiler 6,
    - the temperature detector 11 disposed in the outlet of the boiler 6,
    - external sources such as particularly measuring means for the pressure in the cabin.
- deliver control signals to:
    - the valve 2 for regulation of the warm air flow,
    - the isolation valve 8,
    - the supply valve 9,
    - the purge valve 10.
- transmit data to external sources.

The humidification system is operated when the aircraft reaches a predetermined altitude of the order of be 8,000 to 9,000 meters, and when its operation is started by the pilot.

When this humidification system is in operation, the relative humidity in cabin 4 is controlled such that the dew point in the cabin remains constant. The selected arrangement corresponds to a dew point of 0° C., which corresponds to a relative humidity of 20% for a cabin temperature of 24° C.

The control of the dew point temperature has several advantages:
- the consumption of water is independent of the cabin temperature, and can thus be controlled,
- the risk of condensation on cold regions of the aircraft (windows . . . ) are minimal, and the variations of cabin temperature do not give rise to the formation of dew on cold zones,
- comfort is optimum because the humidity is defined in terms of relative humidity (equivalent to the constant dew point temperature).

The operation of this humidification system is as follows:

In the first instance, when the system is activated, the opening of the supply valve 9 and isolation valve 8 is controlled by the control unit 13, and this until the high level of filling of the boiler 6 is detected by the level detector 12.

During all the period of operation, the open position of the valve 2 for regulation of the warm air flow is regulated by the control unit 13 so as to maintain in the cabin a constant dew point.

Moreover, when the low level is detected by the level detector 12, the control unit 13 controls the opening of the supply valve 9 and the isolation valve 8 until the high level is detected by said detector. This operation ensures periodic refilling of the boiler 6.

Finally, if the aircraft descends below the altitude preselected for operating the system (8,000 to 9,000 meters), or if the relative humidity in the cabin exceeds 30% for a temperature of 24° C., or if the pilot stops the system, the supply valve 9 and isolation valve 8 and regulation valve 2 are closed. These valves are moreover also closed in case of malfunction.

In the final instance, the emptying operations are controlled:

for the boiler 6, when the aircraft descends below a predetermined altitude, for example 6,000 meters, the emptying is automatically initiated. To this end, the supply valve 9 and isolation valve 8 are closed and the control unit 13 controls the opening of the purge valve 10 until the "empty" level is detected by the level detector 12, for the potable water circuit 7, upon reception by the control unit 13 of an emptying control signal delivered by the potable water supply system, or of a manual control signal.

To avoid any risk of overflowing, the control unit 13 thus controls the opening of the purge valve 10 and verifies that the boiler 6 is empty before beginning the emptying of the supply circuit 7. Once the "empty level" signal is received, it causes the opening of the valves 8, 9 while the emptying control signal remains active.

What is claimed is:

1. A process for the humidification of air in an aircraft cabin (4), comprising ejecting water vapor into a heating/air conditioning circuit of the cabin (4) connected to a primary circuit of warm air, said process comprising taking a secondary warm air flow from the primary warm air circuit, introducing this secondary warm air flow into a boiler (6) enclosing an air/water heat exchanger (17) and at least partially filled with water, so as to form in said boiler a flow of water vapor as a function of said secondary warm air flow, mixing at the outlet of the boiler (6) the flow of water vapor and the flow of secondary warm air, so as to obtain a secondary warm air flow loaded with water vapor, and injecting said secondary warm air flow loaded with water vapor into the heating/air conditioning circuit of the air in the cabin (4).

2. A process according to claim 1, further comprising computing the dew point temperature of the air in the cabin (4) from a signal representative of the pressure in the cabin and signals representative of the temperature and humidity measured in the cabin, and limiting the quantity of humidity introduced into the heating/air conditioning circuit, such that the dew point in the cabin will be maintained at a predetermined reference value.

3. A process according to claim 2, further comprising selecting as said reference value a dew point corresponding to 0° C. corresponding to a relative humidity of 20% for a cabin temperature of 24° C.

4. A process according to claim 2, further comprising maintaining a constant value of dew point in the cabin (4) by regulating the secondary warm air flow introduced into the boiler (6).

5. A process according to claim 1, further comprising initially filling the boiler (6) with a predetermined volume of water, and causing periodic refillings of said boiler when the volume of water within the boiler reaches a predetermined minimum level.

6. A process according to claim 1, further comprising causing emptying of the boiler (6) when the aircraft descends below a predetermined altitude.

7. A process according to claim 1, further comprising supplying the boiler from a potable water circuit (7) of the aircraft.

8. A device for humidification for practicing the method according to claim 1, comprising a boiler (6) comprised by a principal closed reservoir enclosing an air/water heat exchanger (17) and provided in a lower portion with a water inlet and a warm air inlet (14) and in the upper portion an outlet collector (15), a secondary conduit (3) for supplying the boiler (6) with warm air connected to a primary warm air circuit, and provided with a valve (2) for regulation of the warm air flow delivered to said boiler, a supply conduit (7) for water to the boiler (6) provided with at least one supply valve (8, 9), a conduit connecting the outlet collector (14) of the boiler (6) and the heating/air conditioning circuit of the aircraft, and a control unit (13) programmed to control each supply valve (8, 9) such as to ensure refilling of the boiler (6) with water, and to adjust the position of the regulation valve (2) so as to regulate the flow of warm air delivered to said boiler.

9. A device as claimed in claim 8, which further comprises a detector (5) of temperature and relative humidity adapted to be disposed in the cabin (4) and adapted to deliver signals representative of the temperature and relative humidity in said cabin, the control unit (13) being programmed to compute, from signals delivered by the temperature and relative humidity detector (5), and from a signal representative of the pressure in the cabin, the dew point in said cabin, and to adjust the valve (2) for regulation of the secondary flow rate of warm air, so as to obtain in the cabin a dew point of predetermined value.

10. A device according to claim 8, which further comprises a level detector (12) disposed within the boiler (6) and adapted to deliver signals representative of the volume of the water contained in said boiler, the control unit (13) being programmed to control the opening of each supply valve (8, 9) upon reception of a signal representative of a predetermined minimum water volume within the boiler (6), and to effect the closing of each supply valve (8, 9) upon reception of a signal representative of a predetermined maximum water volume within said boiler.

11. A device according to claim 10, which comprises a supply valve (9) and an isolation valve (8), disposed in the water supply conduit (7), the control unit (13) being adapted to cause in cascade the opening and the closing of said valves for the refilling of the boiler (6) with water.

12. A device according to claim 10, wherein the level detector (4) is a capacitative detector (12) comprising a tubular probe adapted to extend into a lateral compartment (16) of the boiler (6) in communication with the principal reservoir of said boiler.

13. A device according to claim 8, which further comprises a purge valve (10) for the boiler (6), the control unit (13) being programmed to cause opening of said purge valve when the aircraft descends below a predetermined altitude.

14. A device according to claim 8, which further comprises a temperature detector (11) disposed in the outlet of the boiler (6) and adapted to detect overheating temperatures.

15. A device according to claim 8, wherein the air/water heat exchanger of the boiler (6) is a plate exchanger (17) delimiting conduits (17*a*) for the passage of warm air provided with internal fins (18) connecting said plates.

* * * * *